United States Patent
Boothe et al.

(10) Patent No.: US 9,940,582 B2
(45) Date of Patent: Apr. 10, 2018

(54) INTELLIGENT PROBLEM TRACKING ELECTRONIC SYSTEM FOR OPTIMIZING TECHNICAL SUPPORT

(75) Inventors: Paul A. Boothe, Austin, TX (US); Moises Cases, Austin, TX (US); Bhyrav M. Mutnury, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2648 days.

(21) Appl. No.: 12/199,589

(22) Filed: Aug. 27, 2008

(65) Prior Publication Data

US 2010/0057657 A1 Mar. 4, 2010

(51) Int. Cl.
G06F 11/07 (2006.01)
G06N 5/04 (2006.01)
H04L 12/24 (2006.01)

(52) U.S. Cl.
CPC ............ *G06N 5/04* (2013.01); *G06F 11/079* (2013.01); *G06F 11/0793* (2013.01); *H04L 41/5074* (2013.01)

(58) Field of Classification Search
CPC ..... G06N 5/04; G06F 11/079; G06F 11/0793; H04L 41/5074
USPC .......................................... 706/46; 707/751
See application file for complete search history.

(56) References Cited

U.S. PATENT DOCUMENTS

| | | | |
|---|---|---|---|
| 5,444,823 A * | 8/1995 | Nguyen ........................... | 706/54 |
| 5,715,374 A * | 2/1998 | Heckerman et al. ............. | 706/46 |
| 5,720,001 A * | 2/1998 | Nguyen ........................... | 706/59 |
| 5,758,071 A * | 5/1998 | Burgess et al. ................. | 709/220 |
| 6,233,570 B1 * | 5/2001 | Horvitz et al. .................. | 706/11 |
| 6,289,378 B1 * | 9/2001 | Meyer ..................... | G06F 21/31 709/202 |
| 6,321,348 B1 * | 11/2001 | Kobata ........................... | 714/37 |
| 6,564,209 B1 * | 5/2003 | Dempski et al. | |
| 6,571,236 B1 * | 5/2003 | Ruppelt ........................... | 714/25 |
| 6,591,258 B1 * | 7/2003 | Stier et al. ...................... | 706/50 |
| 6,633,742 B1 * | 10/2003 | Turner et al. .................. | 434/350 |
| 6,829,734 B1 * | 12/2004 | Kreulen et al. ................. | 714/46 |
| 6,876,993 B2 * | 4/2005 | LaButte et al. ................. | 706/47 |
| 6,957,257 B1 | 10/2005 | Buffalo et al. | |
| 7,409,317 B2 * | 8/2008 | Cousin et al. ................. | 702/183 |
| 8,209,758 B1 * | 6/2012 | Doukhvalov et al. .......... | 726/24 |
| 2003/0172002 A1 * | 9/2003 | Spira et al. ..................... | 705/27 |
| 2005/0027827 A1 * | 2/2005 | Owhadi et al. ............... | 709/219 |

(Continued)

*Primary Examiner* — Jorge A Casanova
(74) *Attorney, Agent, or Firm* — Steven M. Greenberg, Esq.; CRGO Law

(57) ABSTRACT

Embodiments of the present invention address deficiencies of the art in respect to technical support management and provide a novel and non-obvious method, system and computer program product for intelligent problem tracking to optimize technical support. In an embodiment of the invention, a method for intelligent problem tracking can include receiving recorded information of tracked end user behavior collected in an end user computing system while the end user addresses a problem in the end user computing system, determining a level of technical sophistication of the user based upon the recorded information, selecting a technical support level corresponding to the determined level of technical sophistication of the user, and transmitting a resolution to the problem in a message to the end user computing system commensurate with the selected technical support level.

18 Claims, 3 Drawing Sheets

(56) References Cited

U.S. PATENT DOCUMENTS

| | | | |
|---|---|---|---|
| 2005/0081118 A1* | 4/2005 | Cheston et al. | 714/47 |
| 2005/0120112 A1* | 6/2005 | Wing et al. | 709/224 |
| 2006/0142910 A1* | 6/2006 | Grier et al. | 701/29 |
| 2008/0172574 A1* | 7/2008 | Fisher | 714/25 |
| 2010/0005384 A1* | 1/2010 | Grabarnik et al. | 715/231 |

* cited by examiner

INTELLIGENT PROBLEM TRACKING ELECTRONIC SYSTEM FOR OPTIMIZING TECHNICAL SUPPORT

BACKGROUND OF THE INVENTION

Field of the Invention

The present invention relates to the field of technical support and more particularly to optimizing technical support based on complexity of user knowledge.

Description of the Related Art

With the increasing use of modern technology, there is a growing requirement to provide technical support to computer users. Technical support may be delivered over the telephone or via various online media such as e-mail or a Web site. Technical support is often subdivided into levels in order to better serve a business or customer base. Success of the organizational structure is dependent on the understanding of the technician of the level of responsibility of the technician, and when to appropriately escalate an issue to a higher support level. The reason for providing a multi-level technical support system instead of one general support group is to provide the best possible service in the most efficient possible manner. A common support structure revolves around a three-tiered technical support system.

Level 1 support is the initial support level responsible for basic customer issues. The first job of a Level 1 specialist is to gather the customer's information and to determine the customer's issue by analyzing the symptoms and figuring out the underlying problem. When analyzing the symptoms, it is important for the technician to identify what the customer is trying to accomplish so that time is not wasted on attempting to solve a symptom instead of a problem. Once identification of the underlying problem is established, the specialist can begin sorting through the possible solutions available. Nevertheless, the goal for this group is to handle a significant majority of the user problems before finding it necessary to escalate the issue to a higher level.

Level 2 support is a more in-depth technical support level than Level 1, which usually contains experienced and more knowledgeable personnel on a particular product or service. Level 2 technicians are responsible for investigating elevated issues and helping to ensure the intricacies of a challenging issue are solved by providing experienced and knowledgeable help. If the problem cannot be solved, then Level 3 support may be needed finally. Level 3 support is the highest level of support in a three-tiered technical support model responsible for handling the most difficult or advanced problems. Level 3 technicians are experts in their fields and are responsible for not only assisting both Tier I and Tier II technical personnel, but with the research and development of solutions to new or unknown issues.

Under current technical support schemes which follow the common three-tiered technical support model, every user that calls technical support is initially connected directly to Level 1 support regardless of how sophisticated the user's knowledge may be. For instance, if a user is a novice user, explaining a technical problem can be a challenge since the user may not have the necessary expertise to clarify the issue or accurately describe measures taken by the user over the phone in a clear and concise manner. This can result in wasted time for both the user and the technical support technician/agent since the technician cannot attempt to solve the issue until the problem has been identified correctly.

Alternatively, if the user is an advanced user capable of explaining the problem clearly, then the advanced power user would most likely know almost all of what Level 1 support is capable of troubleshooting or resolving. In these instances where the advanced user has already taken appropriate measures to resolve the issue but still is in need of an expert technician of Level 2 or Level 3 to resolve the problem, it would be of great convenience to allow the advanced user to by-pass Level 1 support. Unfortunately, the advanced user has no choice other than to initially go through Level 1 support before he/she can even get to Level 2 or 3 technical support. Thus, this results in wasted time for both the advanced user and Level 1 support agent.

Without considering the severity of the issue or technical sophistication of the user, current Level 1 technical support has become an inefficient component of the common three-tiered technical support model.

BRIEF SUMMARY OF THE INVENTION

Embodiments of the present invention address deficiencies of the art in respect to technical support management and provide a novel and non-obvious method, system and computer program product for intelligent problem tracking to optimize technical support. In an embodiment of the invention, a method for intelligent problem tracking can include receiving recorded information of tracked end user behavior collected in an end user computing system while the end user addresses a problem in the end user computing system, determining a level of technical sophistication of the user based upon the recorded information, selecting a technical support level corresponding to the determined level of technical sophistication of the user, and transmitting a resolution to the problem in a message to the end user computing system commensurate with the selected technical support level.

In another embodiment of the invention, receiving recorded information of tracked end user behavior collected in an end user computing system while the end user addresses a problem in the end user computing system can include receiving recorded information tracking at least one modification made by the user to a system registry of the end user computing system recorded while the end user addresses a problem in the end user computing system. In yet another embodiment of the invention, receiving recorded information of tracked end user behavior collected in an end user computing system while the end user addresses a problem in the end user computing system can include receiving recorded information tracking at least one modification made by the user to a configuration of the end user computing system recorded while the end user addresses a problem in the end user computing system.

In another embodiment of the invention, receiving recorded information of tracked end user behavior collected in an end user computing system while the end user addresses a problem in the end user computing system can include receiving an operating system (OS) ticket, wherein the OS ticket archives at least one modification made by the user to a system registry of the end user computing system over an interval of time as the user attempts to address the problem. In yet another embodiment, receiving recorded information of tracked end user behavior collected in an end user computing system while the end user addresses a problem in the end user computing system can include receiving an operating system (OS) ticket, wherein the OS ticket archives at least one modification made by the user to a configuration of the end user computing system over an interval of time as the user attempts to address the problem.

In another embodiment, determining a level of technical sophistication of the user can include analyzing an OS ticket containing at least one modification made by the user to a configuration of the computing system over an interval of time as the user attempts to address the problem, based on the complexity of the behavior of the user. In yet another embodiment, selecting a technical support level can include receiving an OS ticket containing at least one modification made by the user to a configuration of the computing system over an interval of time as the user attempts to address the problem, and connecting the user with technical support level corresponding to the determined level of technical sophistication of the user.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for intelligent problem tracking to optimize technical support. In accordance with an embodiment of the present invention, an Operating System (OS) ticket can be created by a local computer user who has declared an unsolved local computer problem. The OS ticket can track user changes to the configuration of a computer system over an interval of time. Rather than tracking traffic between the Operating System and its drivers, the OS ticket can track actual user changes made to the system configuration or system registry. Once the user submits the OS ticket, an appropriate technical support level can be selected based on analyzing the complexity of user changes contained in the OS ticket. Thus, based on the user's technical knowledge reflected by the analysis of the OS ticket, a corresponding technical support level can be assigned to the user. Finally, the appropriate technical support level can review the user's OS ticket to diagnose the exact issue, and properly solve the user's computer problem in a time-efficient manner.

Figure 1:
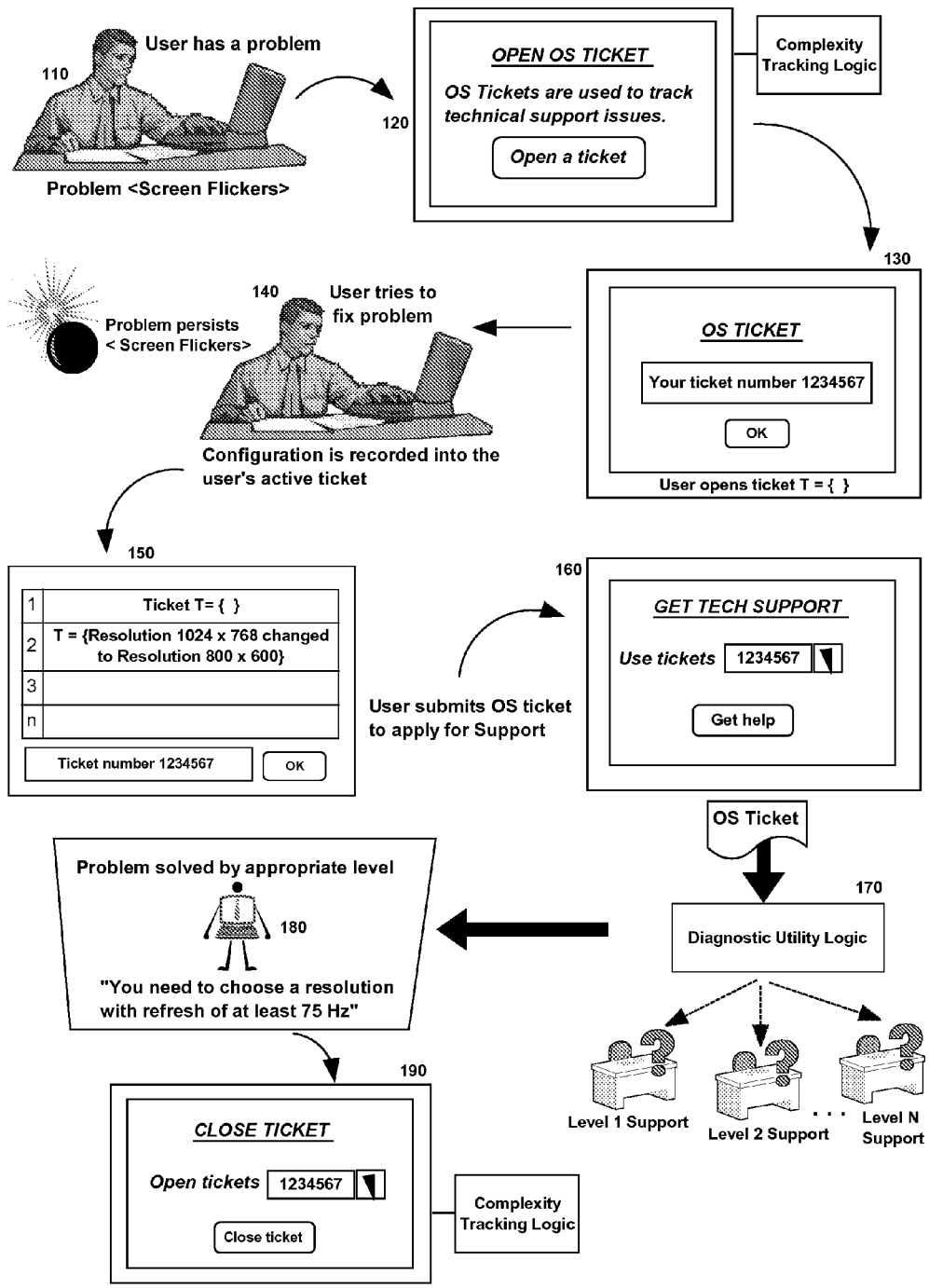
FIG. 1 is a pictorial illustration of a intelligent problem tracking data processing system configured to determine an appropriate technical support level.

In further illustration, FIG. 1 is a pictorial illustration of an intelligent problem tracking data processing system configured to determine an appropriate technical support level. When a user has a computer problem 110 (such as screen flickering), the user can open an OS ticket managed by Complexity Tracking Logic 120 executing in the user's computer. Once the OS ticket is opened a ticket number is assigned to it and it is ready to track technical support issues 130. The user's operating system using Complexity Tracking Logic 120 can be configured to monitor/track via the complexity tracking logic, the state of the system as the user attempts to fix an unknown computer issue (such as screen flickering) 140. Configuration logged in the OS ticket changes can include any OS-level setting changes, parameter changes, configuration changes, or application-level setting changes 150.

For example, if the user's computer has an issue about screen flickering 110, and the user opens an OS ticket 120 and attempts to fix the issue 140, the OS ticket can log any user changes made, such as the user changing the screen resolution from [1024×768] to [800×600]. If the problem(s) are not resolved by the user, then the user can submit the OS ticket to apply for technical support 160. The OS ticket containing the recorded data and history of configuration changes can then be received by the customer service provider for analysis and resolution of the problem using Diagnostic Utility Logic 170. The submitted OS ticket can be analyzed so that appropriate technical level support can be selected based on the complexity of the user changes contained in the OS ticket. Thereafter, the computer problem—in this instance, the "screen flickering"—can be solved by the appropriate technical support level 180 analyzing the OS ticket, identifying the issue and suggesting a solution 180—such as "choose a resolution of at least 75 Hz." Finally the OS ticket can be closed by successfully resolving the problem 190.

Figure 2:
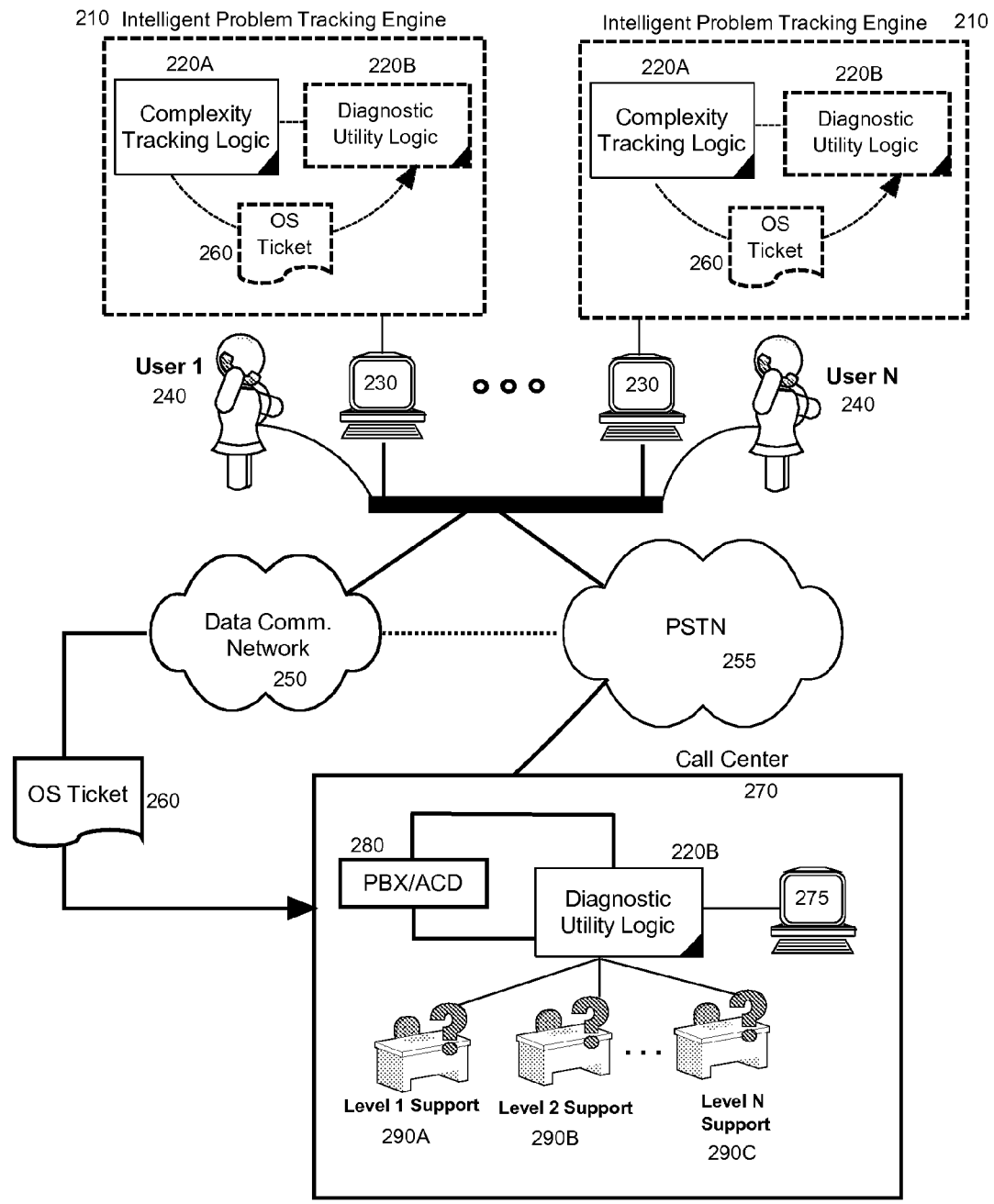
FIG. 2 is a schematic illustration of an intelligent problem tracking data processing system configured to determine an appropriate technical support level.

FIG. 2 is a schematic illustration of an intelligent problem tracking data processing system configured to determine an appropriate technical support level. While FIG. 1 showed a pictorial illustration of a network-based implementation of the intelligent problem tracking data processing system, it can be recognized by one skilled in the art that the intelligent problem tracking data system can also be implemented remotely on a local client. The schematic illustration in FIG. 2 encompasses both implementations—network based and remote client—of the intelligent problem tracking data processing system.

As a network based implementation of an intelligent problem tracking data processing system configured to determine an appropriate technical support level, complexity tracking logic 220 can be communicatively coupled to a local host computer 230. Furthermore, the complexity tracking logic 220 can include program code enabled to track changes made to the configuration of the local host computer over an interval of time. To instantiate the system, a local user 240 can create an OS ticket 260. The OS ticket 260 can track as history, the user's attempt(s) to fix the unknown issue on the computer over an interval of time.

Notably, the complexity tracking logic can be communicatively coupled to the user's operating system in the user's workstation or mobile computing device. The complexity tracking logic can include program code enabled to monitor and track user changes including system configuration changes, application setting changes, or setting changes for the operating system infrastructure. Rather than tracking traffic between the Operating System and its drivers, the OS ticket 260 can record actual user changes made to the system configuration or system registry. Thus, every change made is tracked in the OS ticket with a specific description of the attempt/change the user has made to the system configuration.

If the user 240 is unsuccessful at his/her attempts to fix the problem, the OS ticket 260 can be submitted online by the user through a data communications network 250. The OS ticket can include a ticket number that identifies the OS ticket and any information regarding the user. Once the OS ticket is submitted to a call center 270, diagnostic utility logic 220B can be utilized by the customer service provider.

The diagnostic utility logic 220B can be communicatively coupled to at least one host computing platform executing within a computing environment. The diagnostic utility logic 220B can include program code enabled to analyze the data in the OS ticket 260, properly diagnose the problem, and select the appropriate technical support level 290A, 290B, 290C dynamically in order to resolve and finalize the reported problem with the most effective and lowest-cost utilization of customer service resources. The data in the OS ticket that pertains to the user changes made by the user before submitting the OS ticket, can be analyzed by the diagnostic utility logic 220B to determine the complexity level of the user changes to the application programs or operating system. Thus, based on the user's technical knowledge reflected by the analysis of the OS ticket 260, a corresponding technical support level can be assigned to the user. Finally, the appropriate technical support level 290A, 290B, 290C can review the user's OS ticket to diagnose the exact issue, and properly solve the user's computer problem in a time-efficient manner.

As a remote client implementation of an intelligent problem tracking data processing system configured to determine an appropriate technical support level, complexity tracking logic 220 and diagnostic utility logic 230 can cooperatively be coupled together in an intelligent problem tracking engine 210. The intelligent problem tracking engine 210 can be communicatively be coupled to a local host computer 230. Within the intelligent problem tracking engine, the complexity tracking logic and the diagnostic utility logic can include program code enabled to track as history, the user's attempt(s) to fix the unknown issue on the computer over an interval of time and determine which level of technical support needs to further investigate the issue.

Rather than submitting the OS ticket through a data communications network, an appropriate technical support level can be determined based on analyzing the complexity of user changes contained in the OS ticket. Thus, based on the user's technical knowledge reflected by the analysis of the OS ticket, a corresponding technical support level can be assigned to the user either by giving the user a designated number to call or relevant information that will direct the user to the appropriate support level. Thereafter, the user can place a call via user's telephone 240, incorporating an existing public telephony network 255 such as a PSTN or VoIP network. The call can then be routed through the public network 255 to a private call switching network 280 such as a PBX or ACD of a call center 270. Finally, the appropriate technical support level can review the user's OS ticket to diagnose the exact issue, and properly solve the user's computer problem in a time-efficient manner.

Figure 3:
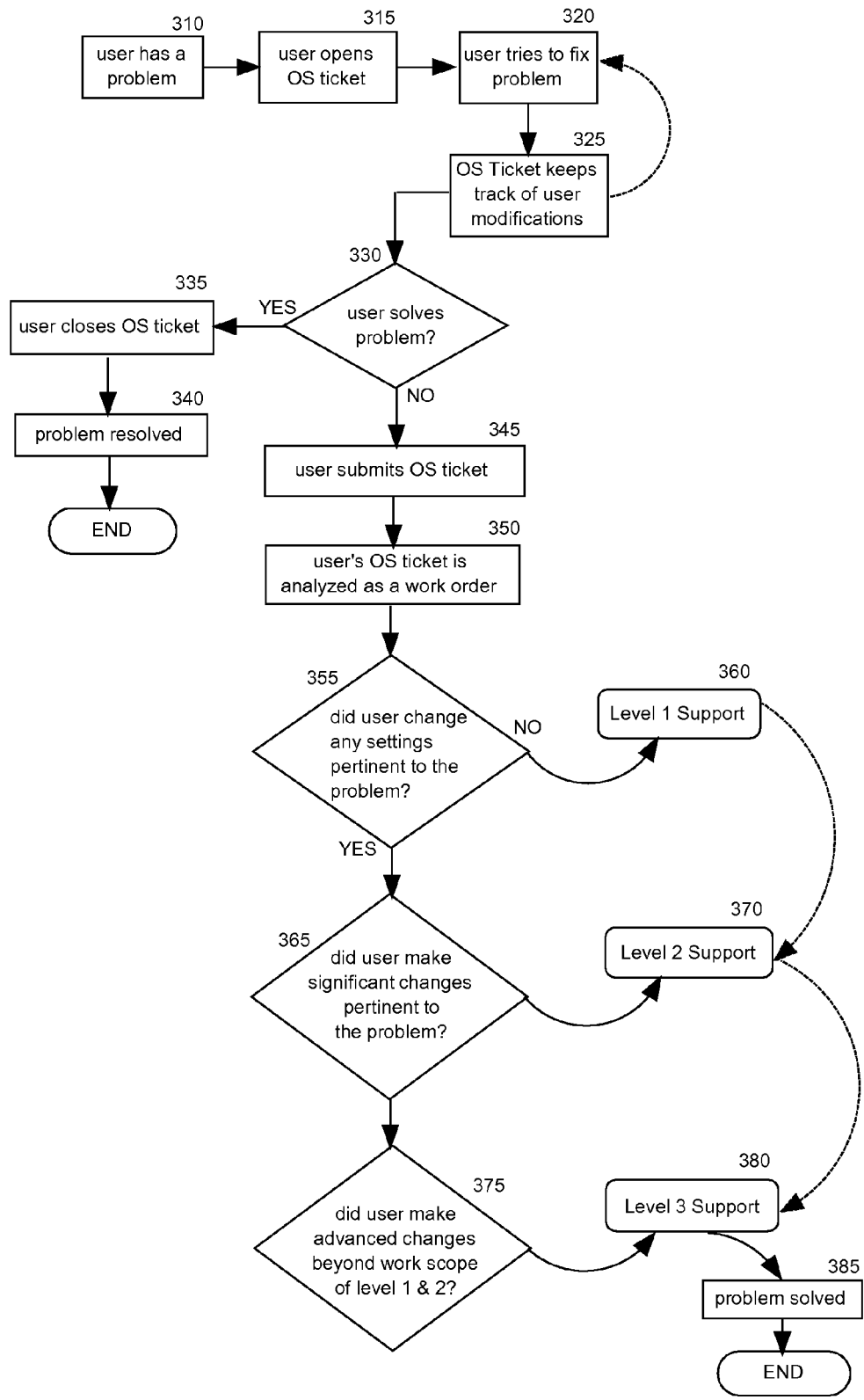
FIG. 3 is a flow chart illustrating a process for intelligent problem tracking in a data processing system configured to determine an appropriate technical support level.

FIG. 3 is a flow chart illustrating a process for intelligent problem tracking in a data processing system configured to determine an appropriate technical support level. The process can be initiated when the user has a problem 310 on the user's computer. Next in block 315, the user can open/create an OS ticket. In block 320 the user tries to fix the problem based on user's technical knowledge/capabilities. Every time the user makes a change, such as system registry changes, the OS ticket can keep track of all of the user's modifications in block 325 until the user is done attempting to fix the issue.

Next, in decision block 330, if the user solves the problem then in block 335, the user can close the OS ticket since the problem has been resolved in block 340. However, if the user cannot solve the problem, then in block 345 the user can submit the OS ticket to be analyzed based on the changes made by the user to the computer in block 350.

In decision block 355, if the user has not made any changes or the changes are not pertinent to the reported issue(s) at hand, the complexity of the user changes in the OS ticket can be classified as basic complexity. Since the user has demonstrated no knowledge about how to fix the problem, it can be implied that he/she is a novice user. Thus, the user and the OS ticket can be directed to Level 1 support 360 for diagnosis and resolution of the problem in block.

In decision block 365, if the user has made significant changes pertinent to the problem, the complexity of the user changes in the OS ticket can be classified as medium complexity. Since the user has demonstrated detailed knowledge of the system yet has not tried everything Level 2 support could suggest as a solution, it can be implied that he/she is a mid-level user. Since the user has not exhausted the scope of Level-2 support, the user and the OS ticket can be directed to Level 2 support 370 for diagnosis and resolution of the problem.

In decision block 375, if the user has made advanced changes beyond the work scope of Level 1 and 2 support, the complexity of the user changes in the OS ticket can be classified as advanced complexity. Since the user has demonstrated advanced knowledge of the system, it can be implied that he/she is a advance/power user. Since the user has made changes which encompass all of the changes which Level 1 and 2 support can suggest, the user and the OS ticket can be directed to Level 3 support 380 for diagnosis and resolution of the problem. Finally, in block 385, the appropriate technical support level 360, 370 or 380 can review the user's OS ticket to diagnose the exact issue, and properly solve the user's computer problem in a time-efficient manner.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for intelligent problem tracking comprising:
   opening an operating system (OS) ticket in memory of an end user computing system;
   responsive to the opening of the OS ticket, monitoring in the end user computing system, end user applied modifications to a configuration of the OS and recording information in the OS ticket of end user behavior in respect to end user applied modifications;
   electronically transmitting the ticket with the recorded information in respect to the end user applied modification to a diagnostic utility logic over a computer communications network and determining in the diagnostic utility logic from the OS ticket a level of technical sophistication of the user based upon the recorded information in respect to the end user applied modification;
   mapping the technical sophistication level to a corresponding technical support level;
   selecting by the diagnostic utility logic the mapped technical support level corresponding to the determined level of technical sophistication of the user; and
   transmitting a resolution to the problem by the diagnostic utility logic to the end user computer system over the computer communications network in a message to the end user computing system commensurate with the selected technical support level.

2. The method of claim 1, wherein receiving recorded information of tracked end user behavior collected in an end user computing system while the end user addresses a problem in the end user computing system comprises receiving recorded information tracking at least one modification made by the user to a system registry of the end user computing system recorded while the end user addresses a problem in the end user computing system.

3. The method of claim 1, wherein receiving recorded information of tracked end user behavior collected in an end user computing system while the end user addresses a problem in the end user computing system comprises receiving recorded information tracking at least one modification made by the user to a configuration of the end user computing system recorded while the end user addresses a problem in the end user computing system.

4. The method of claim 1, wherein receiving recorded information of tracked end user behavior collected in an end user computing system while the end user addresses a problem in the end user computing system comprises receiving an operating system (OS) ticket, wherein the OS ticket archives at least one modification made by the user to a system registry of the end user computing system over an interval of time as the user attempts to address the problem.

5. The method of claim 1, wherein receiving recorded information of tracked end user behavior collected in an end user computing system while the end user addresses a problem in the end user computing system comprises receiving an operating system (OS) ticket, wherein the OS ticket archives at least one modification made by the user to a configuration of the end user computing system over an interval of time as the user attempts to address the problem.

6. The method of claim 1, wherein determining a level of technical sophistication of the user comprises analyzing an OS ticket containing at least one modification made by the user to a configuration of the computing system over an interval of time as the user attempts to address the problem, based on the complexity of the behavior of the user.

7. The method of claim 1, wherein selecting a technical support level comprises receiving an OS ticket containing at least one modification made by the user to a configuration of the computing system over an interval of time as the user attempts to address the problem, and connecting the user with technical support level corresponding to the determined level of technical sophistication of the user.

8. An intelligent problem tracking data processing system comprising:
   a memory and a processor;
   a bus connecting the processor and the memory; and
   intelligent problem tracking logic coupled to the memory, the logic comprising program code enabled to open an operating system (OS) ticket in memory of an end user computing system, responsive to the opening of the OS ticket, monitor in the end user computing system, end user applied modifications to a configuration of the OS and record information in the OS ticket of end user behavior in respect to end user applied modifications, electronically transmit the ticket with the recorded information in respect to the end user applied modification to a diagnostic utility logic over a computer communications network and determine in the diagnostic utility logic from the OS ticket a level of technical sophistication of the user based upon the recorded information in respect to the end user applied modification, map the technical sophistication level to a corresponding technical support level, select by the diagnostic utility logic the mapped technical support level corresponding to the determined level of technical sophistication of the user, and transmit a resolution to the problem by the diagnostic utility logic to the end user computer system over the computer communications network in a message to the end user computing system commensurate with the selected technical support level.

9. The system of claim 8, wherein the intelligent problem tracking engine comprises complexity tracking logic and diagnostic utility logic.

10. The system of claim 9, wherein the complexity tracking logic comprises program code enabled to observe a behavior of a user in addressing a problem in a computing system, and determine a level of technical sophistication of the user based upon the observed behavior.

11. The system of claim 9, wherein the diagnostic utility logic comprises program code enabled to select a technical support level corresponding to the determined level of technical sophistication of the user, and communicate a message through the computing system to the user commensurate with the selected technical support level.

12. A computer program product comprising a non-transitory computer usable storage medium storing computer usable program code for intelligent problem tracking, the computer program product comprising:
  computer usable program code for opening an operating system (OS) ticket in memory of an end user computing system;
  computer usable program code for responding to the opening of the OS ticket by monitoring in the end user computing system, end user applied modifications to a configuration of the OS and recording information in the OS ticket of end user behavior in respect to end user applied modifications;
  computer usable program code for electronically transmitting the ticket with the recorded information in respect to the end user applied modification to a diagnostic utility logic over a computer communications network and determining in the diagnostic utility logic from the OS ticket a level of technical sophistication of the user based upon the recorded information in respect to the end user applied modification;
  computer usable program code for mapping the technical sophistication level to a corresponding technical support level;
  computer usable program code for selecting by the diagnostic utility logic the mapped technical support level corresponding to the determined level of technical sophistication of the user; and
  computer usable program code for transmitting a resolution to the problem by the diagnostic utility logic to the end user computer system over the computer communications network in a message to the end user computing system commensurate with the selected technical support level.

13. The computer program product of claim 12, wherein computer usable program code for receiving recorded information of tracked end user behavior collected in an end user computing system while the end user addresses a problem in the end user computing system comprises receiving recorded information tracking at least one modification made by the user to a system registry of the end user computing system recorded while the end user addresses a problem in the end user computing system.

14. The computer program product of claim 12, wherein computer usable program code for receiving recorded information of tracked end user behavior collected in an end user computing system while the end user addresses a problem in the end user computing system comprises receiving recorded information tracking at least one modification made by the user to a configuration of the end user computing system recorded while the end user addresses a problem in the end user computing system.

15. The computer program product of claim 12, wherein computer usable program code for receiving recorded information of tracked end user behavior collected in an end user computing system while the end user addresses a problem in the end user computing system comprises receiving an operating system (OS) ticket, wherein the OS ticket archives at least one modification made by the user to a system registry of the end user computing system over an interval of time as the user attempts to address the problem.

16. The computer program product of claim 12, wherein computer usable program code for receiving recorded information of tracked end user behavior collected in an end user computing system while the end user addresses a problem in the end user computing system comprises receiving an operating system (OS) ticket, wherein the OS ticket archives at least one modification made by the user to a configuration of the end user computing system over an interval of time as the user attempts to address the problem.

17. The computer program product of claim 12, wherein computer usable program code for determining a level of technical sophistication of the user comprises analyzing an OS ticket containing at least one modification made by the user to a configuration of the computing system over an interval of time as the user attempts to address the problem, based on the complexity of the behavior of the user.

18. The computer program product of claim 12, wherein computer usable program code for selecting a technical support level comprises receiving an OS ticket containing at least one modification made by the user to a configuration of the computing system over an interval of time as the user attempts to address the problem, and connecting the user with technical support level corresponding to the determined level of technical sophistication of the user.

* * * * *